United States Patent [19]

Dyke

[11] Patent Number: 4,888,765
[45] Date of Patent: Dec. 19, 1989

[54] DIGITAL LOOP CARRIER SYSTEM HAVING PROGRAMMABLE TIMESLOT AND BANDWIDTH ALLOCATION CIRCUIT

[75] Inventor: Harry J. Dyke, Oak Forest, Ill.

[73] Assignee: Rockwell International Corporation, El Segundo, Calif.

[21] Appl. No.: 234,972

[22] Filed: Aug. 22, 1988

[51] Int. Cl.⁴ ............................................. H04J 3/16
[52] U.S. Cl. ................................. 370/95.1; 370/85.1; 340/825.51
[58] Field of Search ...................... 370/95, 96, 89, 90; 340/825.5, 825.51

[56] References Cited

U.S. PATENT DOCUMENTS

| | | | |
|---|---|---|---|
| 4,470,140 | 9/1984 | Coffey | 370/95 |
| 4,680,583 | 7/1987 | Grover | 370/96 |
| 4,701,908 | 10/1987 | Ikeda | 370/89 |
| 4,733,390 | 3/1988 | Shirakawa et al. | 370/95 |
| 4,760,573 | 7/1988 | Calvignac et al. | 370/95 |

Primary Examiner—Douglas W. Olms
Assistant Examiner—Min Jung
Attorney, Agent, or Firm—C. B. Patti; V. L. Sewell; H. F. Hamann

[57] ABSTRACT

A system for allocating a plurality of channel units to a transmission line having a plurality of timeslots including bandwidth and multiple time slot allocation. The system has a counter and a parallel to serial register for providing a channel address via an address signal corresponding to a predetermined one of the plurality of timeslots to each of the channel units. A processor is provided for assigning an assigned address to each channel unit of the plurality of channel units, such channel unit being assigned to a different selected timeslot of the plurality of timeslots. Each of the channel units has a comparator for comparing the channel address in the address signal to the assigned address, the channel unit upon having a correspondence between the channel address and the assigned address, transmitting and receiving on the transmission line. A bus connects the plurality of channel units to the means for addressing. An active channel unit can retain control of the transmission line for bandwidth and multiple time slot allocation.

15 Claims, 3 Drawing Sheets 4,888,765

DIGITAL LOOP CARRIER SYSTEM HAVING PROGRAMMABLE TIMESLOT AND BANDWIDTH ALLOCATION CIRCUIT

BACKGROUND OF THE INVENTION

The present invention relates to an apparatus and method for use in channelizing telephone transmission equipment, and in particular, for addressing and assigning channel units to one of 24 timeslots available in a pulse code modulation serial transmission format commonly referred to as T1. This method and circuit not only allows any channel unit access to any of the 24 timeslots but also provides for multiple timeslots in those cases where a channel unit may need additional transmission bandwidth on the T1 line.

The primary purpose of a PCM digital multiplexer system is the conversion of voice frequency signals to digital signals using standard sampling and encoding techniques and the multiplexing of 23 additional digitized samples into the T1 serial transmission format. Within the format of the T1 serial bit stream are 24 eight bit locations commonly referred to as timeslots into which the encoded data can be placed. The normal approach to assigning these timeslots to the individual channels has been on a fixed physical slot to timeslot basis. In other words, each physical slot is identified to a particular timeslot.

At the present time there are two known methods used to select channel units for transmitting and receiving data from the serial bit stream at the respective timeslot. One known carrier system utilizes individual select leads from a common module which decodes the 24 states of a channel counter. This approach, although simple from a channel unit perspective results in a large number of common equipment pinouts and backplane connections. Other known systems perform the selection process in a similar manner with the decoding process performed on the channel unit instead of the common equipment. This approach results in less pinouts for the common equipment but more pinouts for the channel units. This approach to channel unit selection was previously sufficient for these non microprocessor hardware oriented carrier systems.

With the evolution of PCM carrier systems and a number of different timeslot assignment sequences, there is a requirement to provide the ability to re-assign physical slots to different timeslots within the T1 format in order to be backward compatible with the older systems. This requirement was addressed in prior art systems by altering the counting sequence of the channel counter only. This provided the ability to address other sequences in a simple manner. Future interoffice and digital loop carrier systems must not only provide this capability but also provide for a total random assignment of timeslots in order to address future formats and services as necessary.

An additional requirement is imposed by those channel units such as wideband VF or high speed data channels which require access to multiple timeslots from a single physical slot. Although previous systems provided this multiple timeslot capability either by building channel units which spanned several physical slots or the use of blank channel units to prevent contention problems on the data bus, this approach was costly and difficult to administer. It was this requirement which led to the development of the present invention.

SUMMARY OF THE INVENTION

It is an object of the present invention to provide an improved method and apparatus for addressing and assigning channel units to one of a plurality of timeslots in a pulse code modulation serial transmission format, such as a T1 line.

The present invention is a system for allocating a plurality of channel units to a transmission line having a plurality of timeslots. The system has a means for addressing for providing a channel address via an address signal corresponding to a predetermined one of the plurality of timeslots to each of the channel units. A means for processing is provided for assigning an assigned address to each channel unit of the plurality of channel units, such channel unit being assigned to a different selected timeslot of the plurality of timeslots. Each of the channel units has means for comparing the channel address in the address signal to the assigned address, the channel unit upon having a correspondence between the channel address and the assigned address, transmitting and receiving on the transmission line. A means for providing a bus connects the plurality of channel units to the means for addressing.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements and in which:

DESCRIPTION OF THE PREFERRED EMBODIMENT

Figure 1:
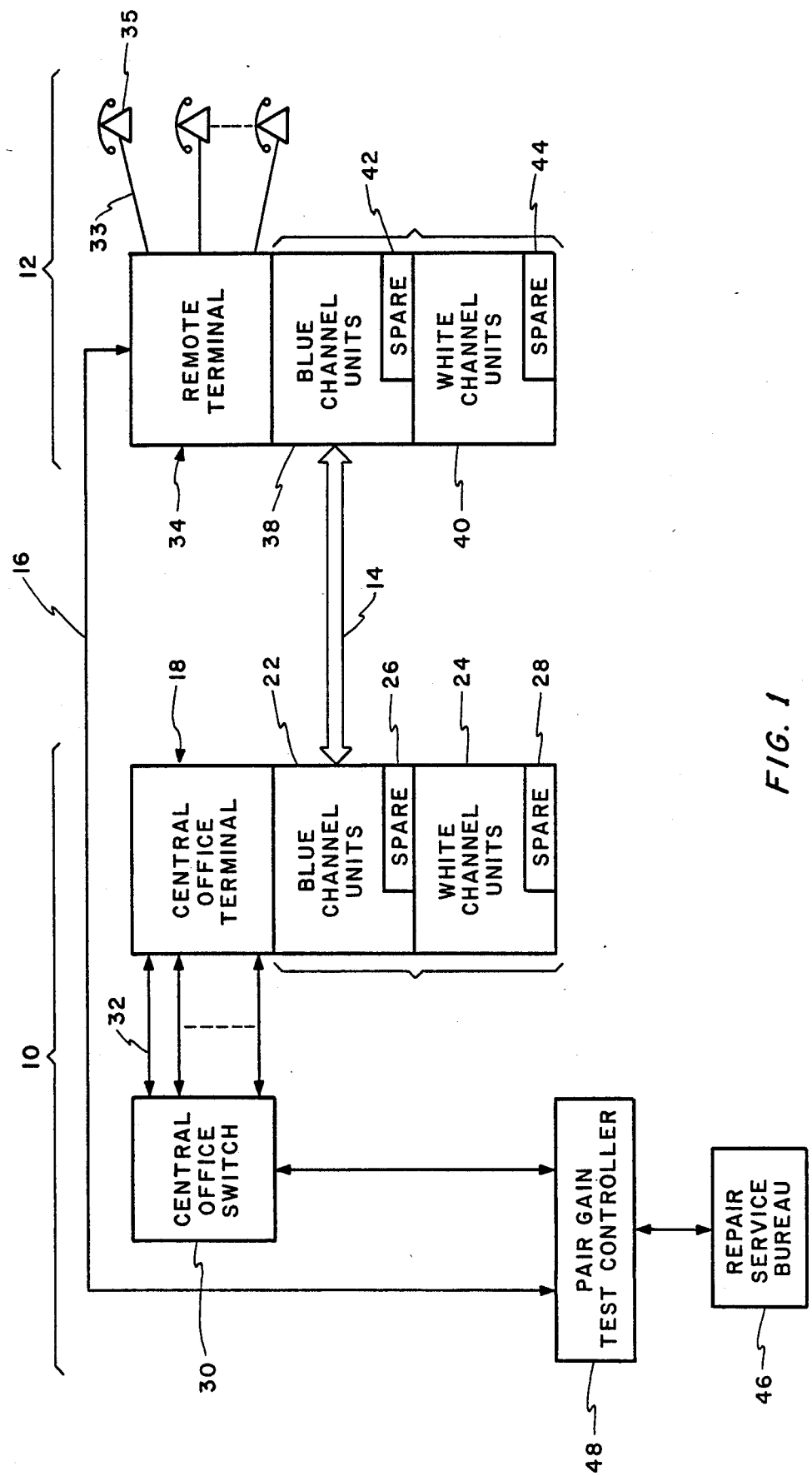
FIG. 1 is a general block diagram depicting a digital carrier loop system incorporating the present invention.

The present invention has general applicability but is most advantageously utilized in a digital loop carrier system of the type shown in FIG. 1. The FIG. 1 general block diagram also depicts the incorporation of a pair gain test system as is known in the prior art with the digital carrier loop system.

As shown in FIG. 1, a central office location 10 is connected to a remote location 12 by digital transmission line system 14 and a bypass pair line 16. The transmission line system 14 is to be understood as having digital multipliers and digital lines between the central office terminal 18 and the remote terminal 34. The bypass pair line 16 is utilized for the pair gain test system. The central office 10 has a central office terminal 18 having channel banks. The channel banks are composed of a plurality of channel units in a blue channel system 22 and a white channel system 24. Each of the channel systems 22 and 24 contain at least one spare channel 26 and 28 respectively. The references to "white" and "blue" channel systems are terminology arbitrarily adopted by Rockwell International for its equipment.

The central office 10 also has a central office switch 30 which is connected by leads 32 to the central office terminal 18. Central office switches which are known in the prior art may be utilized for the central office switch 30 shown in FIG. 1. The central office terminal 18 provides derived subscriber channels over outgoing digital lines 14. A corresponding remote terminal 34 of the system separates the signals on the digital line 14 into a plurality of voice frequency analog signals on local drop wires 33 for delivery to a plurality of subscriber stations 35.

The remote terminal 34 has a blue channel system 38 and a white channel system 40 each having a plurality of channel units and at least one spare channel 42 and 44, respectively.

The central office 10 also includes a repair service bureau 46 for testing purposes. The repair service bureau 46 may be physically located at the central office 10, but often is located at a location remote from the central office 10. The repair service bureau 46 normally includes either manual local test facilities for manually testing loops or may include automatic testing equipment for automatically testing the loops. The principal function of the repair service bureau 46 is a testing of loops when a report of equipment failure is received from a customer at a subscriber station 35. The repair service bureau 46 is connected to a pair gain test controller 48 as is well known in the prior art. The pair gain test controller 48 is connected to the bypass pair line 16 and to the central office switch 30. As is known in the prior art a repair service bureau 46 will use the pair gain test controller 48 to perform a test on the system, thereby identifying for example, a defective channel unit in the remote terminal 34 for a particular associated subscriber station 35. The pair gain test controller 48 determines that a failure exists, but cannot determine if the failure occurs at the central office 10 or at the remote location 12.

Figure 2:
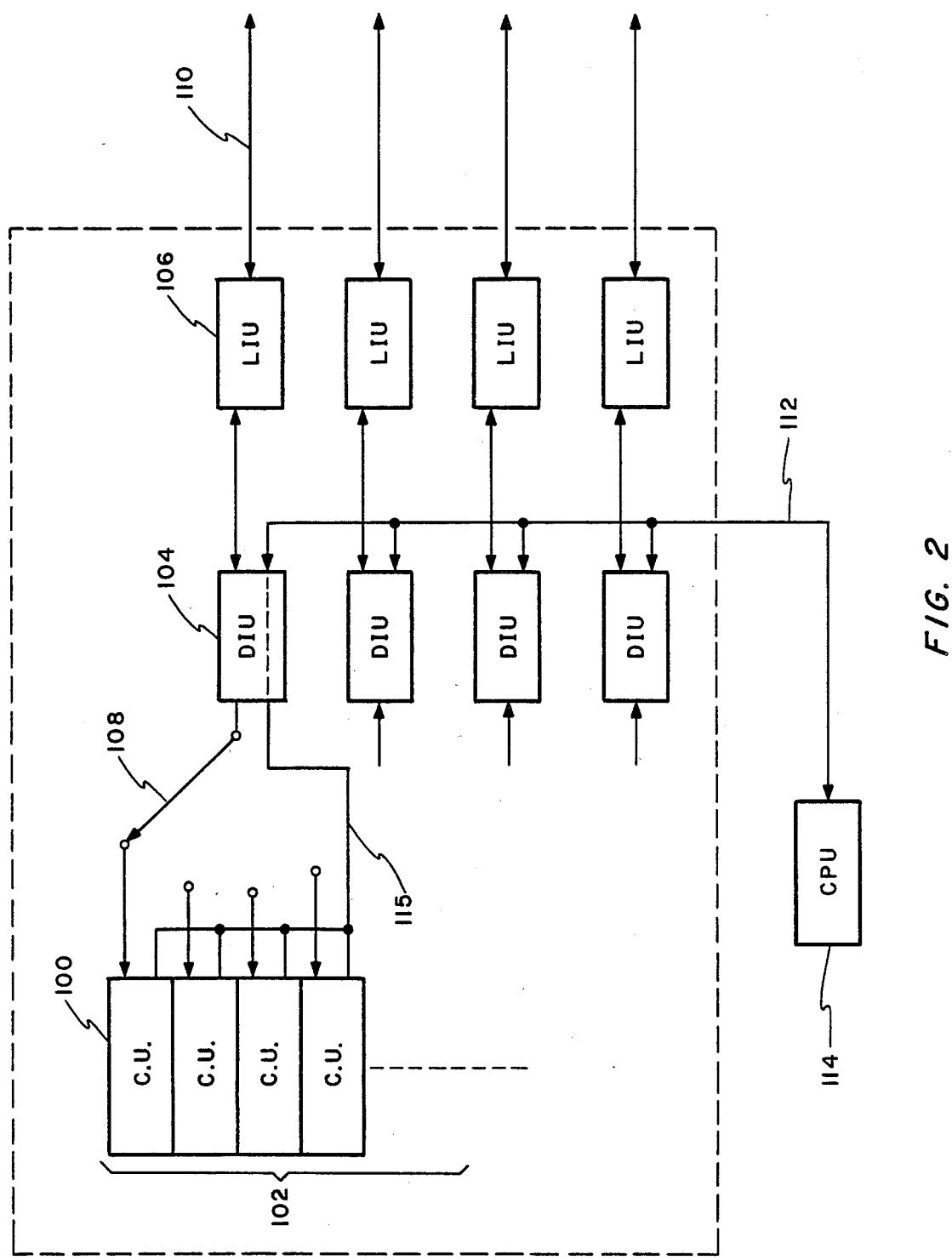
FIG. 2 is a more specific block diagram of the present invention as utilized in the FIG. 1 system.

Each of the blue and white channel unit groups 22, 24 and 38, 40 in the central office terminal 18 and the remote terminal 34 have 96 channel units 100 divided into four groups 102 (see FIG. 2) of 24 channel units each. A digital interface unit (DIU) 104 multiplexes the 24 channel units 100 onto the line interface unit (LIU) 106. The multiplexing function is symbolically represented by the switch 108. The LIU 106 is connected to a predetermined T1 line 110. The DIU 104 provides formatting, main clock source, multiplexing, etc. and the LIU 106 provides signal shaping, power, voltage levels, etc. A bus 112 connects a central processing unit (CPU) 114 to each DIU 104.

Figure 3:
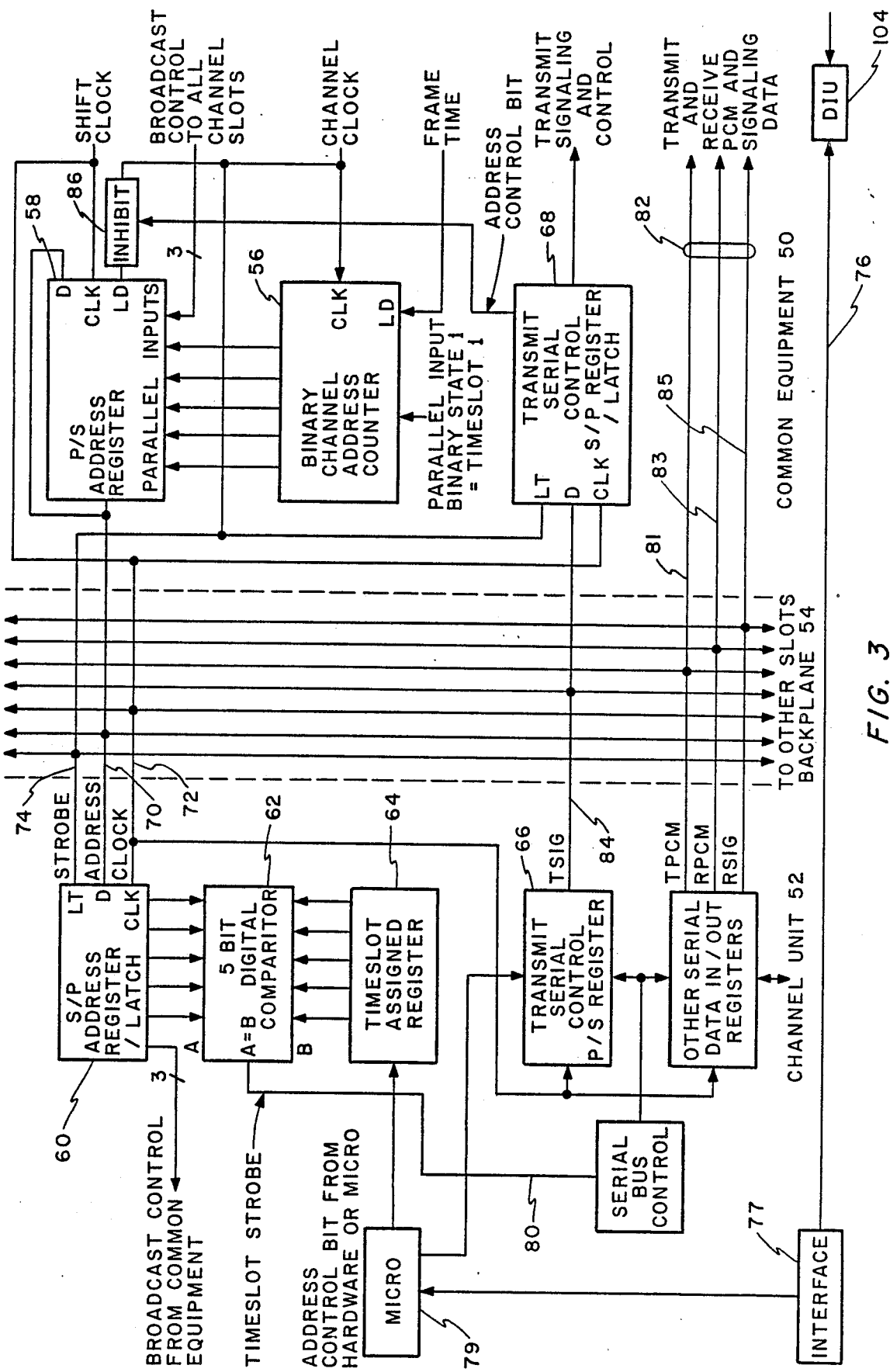
FIG. 3 is a more detailed schematic diagram of the present invention as utilized in the FIG. 1 system.

A schematic of the circuit of the present invention is shown in FIG. 3. The complete circuit is split between the common equipment module 50, and each channel unit 52 and can be contained in either or both of the central office terminal and the remote terminal. The interface between the common equipment module and each channel unit in the form of the backplane bus structure 54 is shown in the drawing between the dotted lines.

A primary system requirement called for a backplane bus architecture which was common to all physical slots. In other words, a common bus approach to all physical slots meant that there could not be a signal lead that was specific to any particular slot such as a slot select signal. This requirement was necessary to facilitate bus selection for the various modes and is met by this circuit.

The channel address counter 56 in the common equipment module 50 is a binary counter which is preloaded to a count of 1 at the beginning of a T1 frame. A complete T1 frame includes the 24 timeslots previously described plus a bit which is used to identify the beginning of the frame or timeslot 1. This counter 56 is incremented once for each timeslot or 24 times each frame. The parallel to serial shift register 58 in the common equipment module 50 converts an address to a serial format which is distributed to all channel unit physical slots along with the clock and strobe signals. The address appears on a serial address bus 70, the clock signal appears on a serial clock bus 72, and the strobe signal appears on a serial strobe bus 74. The strobe signal is used to latch the serial address into a serial to parallel register 60 on each channel unit 52. In this manner, all 24 timeslot addresses are latched on each and every channel unit 52. Essentially the channel unit serial to parallel register 60 is duplicating the channel address counter 56 on each channel unit 52.

Since the serial PCM data is comprised of 8 bits for each timeslot and the entire backplane bus structure follows this same format, the serial address bus 70 must present an address every 8 shift clocks of the parallel to serial address register 58. Because only 5 bits are required to address 24 channels in binary format, the remaining bits on the address bus 70 can be used to broadcast control information to all channel units 52 as shown. The address and control information is latched with the same strobe signal and the address information is presented to a 5 bit digital comparator 62.

Each channel unit 52 then compares the received address with the address assigned to it in the timeslot assigned register 64. This register 64 is assigned a timeslot address which is one of the 24 available timeslots appearing on the serial address bus 70. In the system implementation, this is accomplished via a data link 76 to each channel unit through each DIU from a system controller, such as CPU 114 via DIU bus 112 and CU bus 115 in FIG. 2. When a comparison is made between the address latched in the serial to parallel register 60 and the timeslot assigned register 64, an input/output strobe signal is generated on line 80 which is utilized by the channel unit 52 to transmit and receive data in serial form on the data bus 82. For those situations where it is necessary to inhibit transmission on the data bus 82, the assignment of timeslot 0 to the timeslot assigned register 64 results in no comparator output as this counter state does not appear on the serial address bus 70. This basically describes the programmable timeslot assignment feature of this circuit.

The data link 76 can be connected through an appropriate interface 77 to a microprocessor 79 in each of the channel units 52. Each of the channel units 52 has a physical address which is dependent upon its physical location in the backplane of the equipment. The present invention provides for connecting a selected channel unit to the T1 line in a selected timeslot which is independent of the channel units physical address The second part of this addressing circuit provides for the ability of the channel unit 52 to transmit or receive data in multiple timeslots. This case would be used for those channels units which provide wideband voice or high speed data services. An approach to providing this capability with the circuit as described up to this point would require the use of multiple timeslot assignment registers and comparators which would perform comparisons between the serial to parallel address register 60 and as many time slot registers as necessary to accommodate the number of timeslots.

The approach taken in this circuit to accommodate this situation involves the use of an address control bit which is part of a signal TSIG on the transmit serial control bus 84 as shown This transmit serial control bus 84 is output by the transmit serial control parallel to serial register 66 in the channel unit 52 synchronized with the PCM data bus 82. This address control bit can be used to inhibit the loading of the channel address counter 56 into the parallel to serial address register 58 on the common equipment 50 as shown. The PCM data bus 82 has at least a transmit PCM bus 81, a receive PCM bus 83 and a receive signalling and control bus 85. Via a clock signal on the clock bus 72, the signal TSIG on the transmit serial control bus 84 is synchronized with the PCM data bus 82.

For normal single timeslot transmission by the channel unit 52, the address control bit would be set to a predetermined setting to cause the loading of the channel address into the parallel to serial address register 58 to take place once every timeslot. If a channel unit 52 was of a type which required an additional timeslot, the address control bit would be set to indicate a request for an additional timeslot Within the common equipment 50 is a control bus serial to parallel register 68 which receives the control bit each and every timeslot. This bit can represent a request for another timeslot. When this bit is latched in serial to parallel register 68 in the request for an additional timeslot state, this bit would inhibit the loading of the parallel to serial address register 58 via inhibit gate 86 for that one request.

Since the parallel to serial address register 58 is configured to recirculate the previous address, the previous address which resulted in this inhibit being received would be duplicated on the serial address bus 70. Because the same address would be latched in the channel unit serial to parallel register 60 as before and the same comparison made on the channel unit 52, the strobe which indicates the timeslot to transmit or receive data from the bus 82 would be extended by the additional timeslot. This inhibit of the loading of a new timeslot address into the parallel to serial register 58 could continue for as many timeslots as is required by the channel unit type. During this process, the channel address counter 56 continues incrementing, but those addresses which are inhibited from loading never appear on the serial bus 70.

Upon release of the address control bit, the address appearing on the serial bus 70 is the address of the next available timeslot. Upon latching of this different address in the channel unit 52, the comparison is no longer made and the channel unit 52 would relinquish control of the data and signalling bus 82. In this manner, the channel unit 52 has control of and access to the bus 82 for the bandwidth necessary to support the type of service to which it is designed.

It is to be appreciated that the first channel unit 52 to receive control of the T1 line via the DIU 104 sends the signal TSIG on the bus 84 at the same time it transmits and receives on the PCM data bus 82 in order to obtain multiple timeslots. For the next or second strobe cycle on the strobe bus 74 the counter 56 increases to the next timeslot, but this timeslot address is not loaded into register 58. This is due to the fact that the address control bit latched in register 68 inhibits the loading of register 58 via gate 86. Therefore register 58 sends the same address of the first channel unit on the address bus 70. Only when this channel unit releases the address control bit on TSIG and the resultant loading of the next address from counter 56 can another channel unit have access to the T1 line. Thus the present invention provides for bandwidth allocation based on a specific channel unit type. The advantages provided by this circuit in a digital multiplexer system are detailed below:

A. Common bus interface to all physical slots as there are not individual select leads.
B. The same addressing circuitry can be used for all channel units and is not based on the number of timeslots needed.
C. The address of the first timeslot is the only address that needs to be assigned to the channel unit.
D. The channel unit type and hardware defines the amount of bandwidth and therefore the number of timeslots required.
E. Additional timeslot addresses requested by a channel unit never appear on the address bus. This would eliminate bus contention if other channel units were inadvertently assigned those timeslots.
F. Dynamic control of the bandwidth by the channel unit is possible.
G. Built-in priority scheme based on the lowest address is possible to alleviate bus contention problems or to allow a priority based multiplexing scheme.
H. Serial address bus uses only 5 bits of the 8 available. Additional bits used as broadcast control bits to all channel units.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A system for selectively allocating individual ones of a plurality of channel units to transmit and receive data on a transmission line during a plurality of timeslots of a pulse code modulation serial signal transmitted on a time division multiplexing basis, comprising:
   means for providing a plurality of timeslot binary addresses respectively corresponding to said plurality of timeslots, each of said timeslot binary addresses being provided the timeslot corresponding thereto on a plurality of timeslot address output lines of a register;
   a bus for connecting all said plurality of channel units to said timeslot binary address providing means;
   means for assigning a plurality of channel unit binary addresses to said plurality of channel units which respectively correspond to said plurality of timeslots and to the plurality of timeslot binary addresses corresponding thereto, said channel unit binary addresses being assigned on a relatively permanent basis on a plurality of channel unit binary address output lines of another register; and
   means associated with each of said channel units including means for comparing each of said timeslot binary addresses with said channel unit binary address assigned thereto, said comparing means being responsive to a correspondence between said timeslot binary address and said assigned channel unit binary address by said comparing means to enable transmitting and receiving by said channel unit on said transmission line.

2. The system according to claim 1 wherein said channel unit binary address assigning means includes means for selectively causing one of said channel units to transmit and receive data on said transmission line during a timeslot of another channel unit of lower priority in addition to the timeslot corresponding to its channel unit binary address.

3. The system according to claim 2 wherein said selective causing means causes a channel unit to transmit and receive during at least two consecutive timeslots on said transmission line.

4. The system according to claim 3 wherein at least one of said channel units includes means for controlling the timeslot binary addresses providing means during the timeslot corresponding to its assigned channel unit binary address to enable it to continue to transmit and receive during at least one following timeslot.

5. The system according to claim 1 wherein said means for providing a timeslot binary address has means for counting a multiplex channel clock signal and a parallel to serial register, said parallel to serial register responsive to said counting means for providing said timeslot binary addresses in serial form to all said channel units on said bus.

6. The system according to claim 5 wherein said count is periodically incremented and synchronized to said timeslots on said transmission line.

7. The system according to claim 5 including means for controlling the loading of the clock signal into said parallel to serial register for causing said parallel to serial register to provide the same address corresponding to a timeslot as was provided for a previous timeslot to enable multiple timeslot assignment to a selected channel unit.

8. The system according to claim 7 including means for latching said parallel to serial register and wherein said means for providing a timeslot binary address has a transmit serial control register responsive to a signal TSIG from a channel unit to cause said loading controlling means to operate said register.

9. The system according to claim 1 wherein each of said channel units has a parallel to serial register for receiving at least said timeslot binary address on said bus, a timeslot assigned register for receiving said assigned channel unit binary address from said channel unit binary address assigning means, and means connected to respective outputs of said parallel to serial register and to said time slot assigned register for comparing the timeslot binary address with the channel unit binary address.

10. The system according to claim 1 wherein said bus has at least an address line, a clock line and a strobe line connected between said timeslot binary address providing means and each of said channel units.

11. The system according to claim 9 wherein said bus has a plurality of lines connecting each of said channel units to said transmission line.

12. The system according to claim 8 wherein said bus has a line connecting each of said channel units to said transmit serial control register.

13. A system for system actively allocating a plurality of channel units to transmit and receive on a transmission line during a plurality of timeslots of a pulse code modulated, serial transmission formatted signal on a time multiplexing basis, comprising:

means for selecting one of said plurality of channel units;

means for enabling said selected channel unit to transmit and receive on said transmission line during one of said plurality of timeslots, said selected channel unit transmitting and receiving during said one timeslot; and said selected channel unit having means associated therewith for controlling said selecting means to retain a connection with said transmission line to transmit and receive during at least an additional timeslot following said one timeslot.

14. The system according to claim 13 wherein said controlling means includes means for controlling the selecting means to enable the selected channel unit to transmit and receiving in a plurality of timeslots following said one timeslot.

15. The system according to claim 13 wherein said controlling means has means for relinquishing control of the selecting means to enable another channel unit of said plurality of channel units to transmit and receive on the transmission line during a subsequent timeslot.

* * * * *